(12) United States Patent
Vincent et al.

(10) Patent No.: US 9,895,688 B2
(45) Date of Patent: Feb. 20, 2018

(54) PROCESS FOR REJUVENATING HYDROTREATING CATALYST

(71) Applicant: CATALYST RECOVERY EUROPE S.A., Rodange (LU)

(72) Inventors: Guillaume Vincent, Malling (FR); James Dallas Seamans, The Woodlands, TX (US)

(73) Assignee: CATALYST RECOVERY EUROPE S.A., Rodange (LU)

( * ) Notice: Subject to any disclaimer, the term of this patent is extended or adjusted under 35 U.S.C. 154(b) by 0 days.

(21) Appl. No.: 15/304,323

(22) PCT Filed: Apr. 16, 2015

(86) PCT No.: PCT/EP2015/058303
§ 371 (c)(1),
(2) Date: Oct. 14, 2016

(87) PCT Pub. No.: WO2015/158846
PCT Pub. Date: Oct. 22, 2015

(65) Prior Publication Data
US 2017/0036202 A1 Feb. 9, 2017
US 2017/0232432 A9 Aug. 17, 2017

(30) Foreign Application Priority Data

Apr. 16, 2014 (LU) .......................... 92430

(51) Int. Cl.
| | |
|---|---|
| *B01J 38/48* | (2006.01) |
| *B01J 37/20* | (2006.01) |
| *B01J 37/28* | (2006.01) |
| *B01J 38/02* | (2006.01) |
| *B01J 38/12* | (2006.01) |
| *B01J 38/60* | (2006.01) |
| *B01J 23/94* | (2006.01) |
| *B01J 23/882* | (2006.01) |
| *B01J 23/883* | (2006.01) |
| *B01J 37/02* | (2006.01) |
| *B01J 23/881* | (2006.01) |
| *C10G 45/08* | (2006.01) |

(52) U.S. Cl.
CPC .......... *B01J 38/485* (2013.01); *B01J 23/881* (2013.01); *B01J 23/882* (2013.01); *B01J 23/883* (2013.01); *B01J 23/94* (2013.01); *B01J 37/0201* (2013.01); *B01J 37/20* (2013.01); *B01J 37/28* (2013.01); *B01J 38/02* (2013.01); *B01J 38/12* (2013.01); *B01J 38/60* (2013.01); *C10G 45/08* (2013.01); *C10G 2300/202* (2013.01); *C10G 2300/70* (2013.01)

(58) Field of Classification Search
CPC ...... B01J 38/485; B01J 23/882; B01J 23/883; B01J 23/28; B01J 23/90; B01J 23/92; B01J 23/94; B01J 37/0201; B01J 37/20; B01J 37/28; B01J 38/02; B01J 38/12; B01J 38/16; B01J 38/60; C10G 45/08; C10G 2300/202; C10G 2300/70
USPC ................ 502/20, 22, 38, 55, 313–315, 321
See application file for complete search history.

(56) References Cited

U.S. PATENT DOCUMENTS

| | | | | |
|---|---|---|---|---|
| 4,006,168 | A * | 2/1977 | Kerr ........................ | B01J 23/92 502/38 |
| 4,052,332 | A * | 10/1977 | D'Amore ............... | B01J 23/002 502/211 |
| 4,895,816 | A * | 1/1990 | Gardner .................. | C10G 65/04 502/10 |
| 6,486,220 | B1 * | 11/2002 | Wright .................. | B01J 23/8896 502/20 |
| 8,128,811 | B2 * | 3/2012 | McCarthy ................ | B01J 23/85 208/208 R |
| 2002/0198096 | A1* | 12/2002 | Wright .................. | B01J 23/8896 502/38 |
| 2003/0104926 | A1* | 6/2003 | Eijsbouts .................. | B01J 23/94 502/29 |
| 2007/0275845 | A1 | 11/2007 | Jansen et al. | |
| 2009/0261019 | A1 | 10/2009 | McCarthy et al. | |
| 2010/0093517 | A1 | 4/2010 | Kato | |
| 2010/0105540 | A1* | 4/2010 | Galliou ..................... | B01J 23/85 502/28 |
| 2013/0165316 | A1 | 6/2013 | Guichard et al. | |
| 2014/0076780 | A1 | 3/2014 | Guichard et al. | |

FOREIGN PATENT DOCUMENTS

| | | | |
|---|---|---|---|
| EP | 2165763 A | 3/2010 | |
| JP | 2008-290071 | * 12/2008 | .............. B01J 31/22 |
| JP | 2008/290071 A | 12/2008 | |
| WO | 2005/035691 A | 4/2005 | |
| WO | 2009/126319 A | 10/2009 | |

OTHER PUBLICATIONS

International Search Report in respect to International Application No. PCT/EP2015/058303, dated Jun. 22, 2015.

* cited by examiner

*Primary Examiner* — Patricia L. Hailey
(74) *Attorney, Agent, or Firm* — Greenblum & Bernstein, P.L.C.

(57) ABSTRACT

The invention refers to a process for rejuvenating a hydrotreating catalyst comprising a group VIB hydrogenation metal and/or a group VIII hydrogenation metal, which comprises the steps of: (a) regenerating the catalyst by contacting said catalyst with an oxygen containing gas at a temperature from about 300° C. to 550° C., (b) impregnating the regenerated carbon-reduced catalyst with an impregnation solution which comprises a mixture of water and a combination of $MoO_3$ and $H_3PO_4$, (c) aging the impregnated catalyst and (d) drying the aged catalyst. The invention also refers to the rejuvenated catalyst obtained and its use for hydrotreating hydrocarbon feedstocks.

20 Claims, No Drawings

PROCESS FOR REJUVENATING HYDROTREATING CATALYST

TECHNICAL FIELD

The present invention generally relates to a process for rejuvenating a hydrotreating catalyst, the resulting catalyst obtained through this process and its use in hydrotreating process.

BACKGROUND ART

The hydrocarbon feedstocks, the raw materials used in petroleum refining industrial industry, need to be refined before they can be used in numerous products and processes. A large part of the hydrocarbon feedstocks are submitted to a so called hydrotreating process. The purpose of hydrotreating is to reduce the amounts of impurities in the hydrocarbon feedstocks.

In particular, hydrotreating aims the removal of sulfur and nitrogen compounds.

The hydrocarbon feedstocks often contain sulfur and nitrogen compounds. These compounds are responsible of the release of sulfur oxides and nitrogen oxides in the atmosphere when the hydrocarbon products are used as fuel and burnt. These sulfur oxides and nitrogen oxides are considered harmful for the environment. As a consequence, national and international regulators are continuously imposing lower nitrogen and sulfur contents in fuel so as to reduce pollution of the environment by reducing as much as possible the quantities of these compounds when the fuel is burnt. There is thus an increased need to develop more efficient hydrotreating processes.

The efficiency of hydrotreating process relies in part on the activity of hydrotreating catalysts used. These catalysts allow converting feedstocks into useable materials. Nevertheless, at each use, the activity of the catalysts decreases. The resulting spent catalysts may thus be used in less demanding kinds of hydrotreating processes or have to be at least regenerated.

However, the regenerated catalysts do not show as high activity as the original catalysts due to the formation of agglomerates of catalyst metals.

Numerous processes have been developed in order to reactivate the spent hydrotreating catalysts such as for example the so-called rejuvenation process. The rejuvenation aims to restore the original activity of the hydrotreating catalysts or at least an activity superior to the one obtained after a simple regeneration step.

For example, document WO2005/035691 describes a process for activating a hydrotreating catalyst comprising a group VIB hydrogenation metal oxide and a group VIII hydrogenation metal oxide. This process comprises a step of impregnation with a solution comprising an acid and an organic additive which has a boiling point in the range of 80° C. to 500° C. and a solubility of at least 5 g/L (20° C., atmospheric pressure). After the impregnation step, the catalyst is then dried to maintain at least 50 wt % of the additive after drying.

However, the efficiency of the rejuvenation process may depend on several parameters such as: the catalyst to be treated, the operational conditions of the process or the rejuvenating agent used.

Thus, there is still a need to develop efficient and easy to implement processes for restoring the activity of the spent hydrotreating catalysts.

TECHNICAL PROBLEM

It is an object of the present invention to provide an efficient and easy to implement process for rejuvenating hydrotreating catalysts.

This object is achieved by a process for rejuvenating hydrotreating catalysts as described below.

GENERAL DESCRIPTION OF THE INVENTION

In order to overcome the above-mentioned problem, the present invention provides a process for rejuvenating a hydrotreating catalyst comprising a group VIB hydrogenation metal and/or a group VIII hydrogenation metal, which comprises the steps of:
a) regenerating the catalyst by contacting said catalyst with an oxygen containing gas at a temperature from 300° C. to 550° C.,
b) impregnating the regenerated catalyst with an impregnation solution which consists of a mixture of water and a combination of $MoO_3$ and $H_3PO_4$, excluding any other compounds,
c) aging the impregnated catalyst for at least 2 hours at room temperature and
d) drying the aged catalyst wherein the impregnation of the catalyst with said impregnation solution in step b) leads to the rejuvenation of said catalyst.

The implementation of this process leads to a significant improvement of the activity of the catalyst.

Without being bound by any theory, the improvement of the activity of the catalyst seems to be due to:

The improvement of the dispersion of $MoO_3$ on the support surface as observed by electronic microscopy;

The dissolution of undesirable $CoMoO_4$ or $NiMoO_4$ crystalline phases as observed by X-Ray diffraction.

The impregnation solution consist of a mixture of water and a rejuvenating agent (or recovering agent) which is: a combination of $MoO_3$ and $H_3PO_4$.

The hydrotreating catalyst to be used to this process may be a non-additive based catalyst or an additive based catalyst. The term "non-additive based catalyst" refers to a catalyst wherein no organic additive has been included therein prior to its use in the hydrotreating process of a hydrocarbon feedstock or prior to a presulfurization treatment performed before the use in the hydrotreating process. The term "additive based catalyst" refers to a catalyst wherein an organic additive has been included therein prior to its use in the hydrotreating process of a hydrocarbon feedstock or prior to a presulfurization treatment performed before its use in the hydrotreating process.

The initial concentration of carbon of the spent hydrotreating catalyst (namely before being submitted to the process for rejuvenating) may for example be comprised from 5 wt % to 25 wt % based on the total weight of the hydrotreating catalyst before being submitted to the process for rejuvenating.

The hydrotreating catalyst comprises a group VIB hydrogenation metal. The group VIB hydrogenation metal may be chosen among chromium, molybdenum, or tungsten. Preferably, the group VIB hydrogenation metal is molybdenum. The amount of group VIB hydrogenation metal may preferably be between 5 wt % and 25 wt % and more preferably between 10 wt % and 20 wt % based on the total weight of the hydrotreating catalyst, the concentration of group VIB hydrogenation metal being expressed as element and not as oxide, for example, when group VIB hydrogenation metal is Mo, the concentration is expressed as wt % of Mo instead of wt % of $MoO_3$.

The hydrotreating catalyst also comprises a group VIII hydrogenation metal. The group VIII hydrogenation metal may be preferably selected in the group consisting of iron, cobalt and nickel. In particular, the group VIII hydrogenation metal is cobalt or nickel, or a combination thereof. Advantageously, the amount of group VIII hydrogenation metal is comprised from 1 wt % to 8 wt % and more advantageously from 3 wt % to 5 wt % based on the total weight of the hydrotreating catalyst, the concentration of group VIII hydrogenation metal being expressed as element and not as oxide.

The hydrotreating catalyst may also comprise additional components such as for example, halogens, boron and/or phosphorus. The hydrotreating catalyst may preferably comprise from 0.5 wt % to 1 wt % and in a more preferred way is about 0.8 wt % of boron based on the total weight of the hydrotreating catalyst, the concentration of boron being expressed as element and not as oxide (expressed as B). According to an embodiment, the hydrotreating catalyst comprises from 0.5 to 8 wt % and preferably from 0.8 to 5 wt % of phosphorus based on the total weight of the hydrotreating catalyst, the concentration of phosphorus being expressed as element and not as oxide (expressed as P).

The hydrotreating catalyst may also comprise a carrier, preferably a porous carrier. This carrier may be made of alumina and/or silica and alumina is preferred.

Preferably, the total pore volume of the support may be in the range of from about 0.2 cc/g to about 2 cc/g. Advantageously, the surface area of the support, measured by the B.E.T. (Brunauer, Emmett and Teller) method, may be in the range of from about 100 to about 400 m$^2$/g.

Before being submitted to the process for rejuvenating, the hydrotreating catalyst may be previously treated by stripping (before step a) of the process). This optional step of stripping allows removing the volatile hydrocarbons retained on the spent catalyst. The spent catalyst is contacted with a hot steam or gas, diluted air, natural combustion gas products or nitrogen at a temperature comprised from 150° C. and 450° C.

Step a) of the process according to the present invention refers to the regeneration of the hydrotreating catalyst. The regeneration step is carried out by contacting said catalyst with an oxygen containing gas at a temperature comprises from 300° C. to 550° C., preferably between 400° C. and 500° C. Preferably, the oxygen-containing gas is for example air and the oxygen concentration between 10 and 21% vol. Advantageously, the regeneration step may be performed until the content of carbon of the catalyst decreases below 0.5 wt % based on the total weight of the catalyst. According to an embodiment of the invention, the hydrotreating catalyst after the regeneration step a) may for example comprise a content of carbon inferior or equal to 0.4 wt %; inferior or equal to 0.3 wt %; inferior or equal to 0.2 wt %, or inferior or equal to 0.1 wt % based on the total weight of the catalyst. According to an embodiment of the invention, the content of carbon of the hydrotreating catalyst after the regeneration step a) may be for example superior or equal to 0; superior or equal to 0.1 wt %; superior or equal to 0.2 wt %; superior or equal to 0.3 wt %; or superior or equal to 0.4 wt % based on the total weight of the catalyst.

Preferably, the percentage of carbon may be inferior to 0.5 wt % after the regeneration step a). The catalyst obtained at the end of the regeneration step shows an activity, which may be for example between 75 to 90% versus fresh. The regeneration step generally takes place in a moving belt or a rotary kiln. At the end of the oxidative regeneration, metals supported on carrier are obtained.

The regenerated carbon-reduced catalyst is then submitted to an impregnation step. In fact, the catalyst is contacted with an aqueous solution. This impregnation solution consists of water and a combination of $MoO_3$ and $H_3PO_4$.

The rejuvenating agent (or recovering agent) is the combination of $MoO_3$ and $H_3PO_4$. The impregnation of the catalyst with this impregnation solution leads to the rejuvenation of said catalyst. The impregnation of the catalyst is carried out preferably up to the total pores saturation of the catalyst.

According to one embodiment, the concentration of $MoO_3$ is preferably comprised from 0.10 mol of $MoO_3$/mol of hydrogenation metals (based on the regenerated catalyst) to 1.0 mol of $MoO_3$/mol of hydrogenation metals (based on the regenerated catalyst) and more preferably is about 0.2 mol of $MoO_3$/mol of hydrogenation metals (based on the regenerated catalyst). According to a preferred embodiment, the concentration of $H_3PO_4$ may be comprised from 0.10 mol of $H_3PO_4$/mol of hydrogenation metals (based on the regenerated catalyst) to 1.0 mol of $H_3PO_4$/mol of hydrogenation metals (based on the regenerated catalyst). Advantageously, the concentration of $H_3PO_4$ is about 0.30 mol of $H_3PO_4$/mol of hydrogenation metals. The concentrations given are based on the amounts of hydrogenation metals measured on the regenerated catalyst.

According to an embodiment, the concentration of $H_3PO_4$ in water is comprised from 5 wt % to 25 wt % and more preferably from 7 wt % to 20 wt %.

Advantageously, the concentration of $MoO_3$ in water is comprised from 5 wt % to 25 wt % and more advantageously from 7 wt % to 20 wt %.

The impregnation solution consists of a mixture of water and a combination of $MoO_3$ and $H_3PO_4$, by excluding any other compounds.

Preferably, the mixture of water and a combination of $MoO_3$ and $H_3PO_4$ may comprise:
Water from 90 to 60 wt % of the mixture,
$MoO_3$ from 5 to 20 wt % of the mixture, and
$H_3PO_4$ from 5 to 20 wt % of the mixture,
provided that the sum of these three components is 100%.

According to an embodiment of the invention, the impregnated catalyst may be preferably aged for at least 2 hours, preferably for at least 6 hours, more preferably for at least 12 hours, most preferably for at least 14 hours and in particular for at least 16 hours. The impregnated catalyst may be preferably aged in step c) for example for at least 24 hours, more preferably for at least 40 hours, and even more preferably for at least 96 hours. The aging step is preferably performed at room temperature. During the aging, an exothermic reaction occurs and the temperature of the catalyst may increase until 50° C. or even more. Preferably, the end of the aging step occurs when the undesirable crystalline phases such as CoMoO4 or NiMoO4 have disappeared. Those crystalline species can be easily monitored by XRD (X-rays Diffraction). According to an embodiment, the aging time does not exceed 504 hours, preferably does not exceed 336 hours and more preferably does not exceed 168 hours.

After the aging step, the resulting catalyst is then dried in order to remove at least a part the water, preferably at least 80 wt % of water and more preferably at least 85 wt % of water. The drying step is preferably performed at a temperature comprised from 80° C. to 200° C., preferably from 100° C. to 150° C., and more preferably is about 120° C. Generally, the drying step is carried out preferably until a residual loss on ignition below 15 wt % based on the catalyst weight is reached. This parameter can be measured. This step may last for example about one hour.

The process may also comprise an optional step, which consists of sulfudizing the rejuvenated catalyst obtained. The sulfidizing step is performed after the step of drying d). Indeed, before being used in hydrotreating, the catalysts are generally sulfided in order to convert the hydrogenation metals into their sulfides.

The catalysts obtained through the rejuvenation process, show a better activity than the regenerated catalyst and even in certain cases an activity which is superior to the fresh catalysts (namely catalysts which have never been used).

An aspect of the present invention also concerns the rejuvenated catalyst obtained through this process for rejuvenating and its use for hydrotreating process. In particular, a process for hydrotreating hydrocarbon feedstocks in which a hydrocarbon feedstock is contacted under hydrotreating conditions with a rejuvenated catalyst obtained through the rejuvenation process according to the present invention.

All the embodiments previously mentioned may be combined within reason.

EXAMPLES

Example 1: Rejuvenation Process with a Mixture of $MoO_3$ and $H_3PO_4$

The hydrotreating catalysts, namely non-additive based catalysts: Commercial CoMo catalyst 1 (TK-576 BRIM), Commercial NiMo catalyst 1 (HR-538) and Commercial CoMo catalyst 2 (DC-2532), have been treated with the rejuvenating process using phosphoric acid ($H_3PO_4$) in combination with $MoO_3$. First, the catalysts have been stripped to remove hydrocarbon, then regenerated between 400 and 450° C. under air atmosphere to remove carbon and sulfur to achieve carbon content less than 0.5 wt % for those hydrotreating catalysts. After oxidative regeneration, metals supported on alumina carrier are obtained. The physical and the chemical properties of the regenerated catalysts are as follows:

|  | Commercial CoMo catalyst 1 | Commercial NiMo catalyst 1 | Commercial CoMo catalyst 2 |
|---|---|---|---|
| Carbon content (wt %) | 0.34 | 0.05 | 0.16 |
| Sulfur content (wt %) | 0.52 | 0.21 | 0.34 |
| Surface area (m²/g) | 196 | 202 | 199 |
| Water Pore Volume (cc/g) | 0.465 | 0.578 | 0.567 |
| LOI at 485° C. (wt %) | 1.81 | 0.67 | 1.09 |
| Cobalt content (wt %) | 3.55 | — | 3.10 |
| Molybdenum content (wt %) | 14.68 | 10.84 | 10.85 |
| Nickel content (wt %) | — | 2.28 | 0.56 |
| Phosphorus content (wt %) | — | 2.51 | 2.16 |
| Boron content (wt %) | 0.82 | — | — |

The regenerated catalysts have been impregnated with phosphoric acid in association with $MoO_3$, in aqueous solution, up to total pores saturation. The concentration of $MoO_3$ in water, namely the concentration of $MoO_3$ impregnation solution used to impregnate the regenerated catalyst is: 11.1 $MoO_3$ wt % for Commercial CoMo catalyst 1; 6.8 $MoO_3$ wt % for Commercial NiMo catalyst 1 and 7.8 $MoO_3$ wt % for Commercial CoMo catalyst 2. The concentration of $H_3PO_4$ in water, namely the concentration of $H_3PO_4$ in impregnation solution used to impregnate the regenerated catalyst is: 12.5 $H_3PO_4$ wt % for Commercial CoMo catalyst 1; 7.6 $H_3PO_4$ wt % for Commercial NiMo catalyst 1 and 8.8 $H_3PO_4$ wt % for Commercial CoMo catalyst 2. Then, the regenerated-impregnated catalysts have been aged for at least 16 hours at room temperature to obtain an aged-impregnated catalyst. The aged-impregnated catalysts have been dried at 120° C. during about 1 hour to obtain rejuvenated catalysts.

The chemical composition of the rejuvenated hydrotreating catalysts after the regeneration and the impregnation steps is as follows:

|  | Commercial CoMo catalyst 1 | | Commercial NiMo catalyst 1 | | Commercial CoMo catalyst 2 | |
|---|---|---|---|---|---|---|
|  | Regenerated | Rejuvenated | Regenerated | Rejuvenated | Regenerated | Rejuvenated |
| Mo (wt %) | 14.68 | 16.90 | 10.84 | 13.10 | 10.85 | 12.95 |
| Co (wt %) | 3.55 | 3.26 | — | — | 3.10 | 2.89 |
| Ni (wt %) | — | — | 2.28 | 2.11 | 0.56 | 0.53 |
| P (wt %) | — | 1.94 | 2.51 | 4.01 | 2.16 | 3.96 |

The activities of regenerated and rejuvenated Commercial CoMo catalyst 1 have been checked with SRGO+ feedstock using the following operational conditions: P=30 bar; LHSV (Liquid Hourly Space Velocity)=1.5 hr$^{-1}$; $H_2$/Oil=250 sl/l; WABT (Weighted Average Bed Temperature)=350° C.

The activities of regenerated and rejuvenated Commercial NiMo catalyst 1 have been checked with SRGO+ feedstock using the following operational conditions: P=35 bar; LHSV=1.3 hr$^{-1}$; $H_2$/Oil=200 sl/l; WABT=335 to 355° C.

The activities of regenerated and rejuvenated Commercial CoMo catalyst 2 have been checked with SRGO+ feedstock using the following operational conditions: P=41.4 bar; LHSV=1.5 hr$^{-1}$; $H_2$/Oil=214 sl/l; WABT=343° C.

The composition of SRGO+ feedstock is:

| SULFUR | MG/KG | 8920 |
|---|---|---|
| NITROGEN BASIC | MG/KG | 26.0 |
| NITROGEN | MG/KG | 50 |
| DENSITY AT 25° C. | G/ML |  |
| DENSITY AT 15° C. | G/ML | 0.8388 |
| HYDROGEN | WT % |  |

-continued

| | | |
|---|---|---|
| MONO-AROMATICS | WT % | 15.8 |
| DI-AROMATICS (DAH) | WT % | 9.7 |
| TRI+-AROMATICS (T + AH) | WT % | 0.5 |
| BROMINE NUMBER | G/100 G | 1.1 |

The hydrodesulfurization relative volume activity has been measured for every rejuvenated catalyst. The following results have been obtained.

| | Commercial CoMo catalyst 1 | Commercial NiMo catalyst 1 | Commercial CoMo catalyst 2 |
|---|---|---|---|
| Fresh | 100% | 100% | 100% |
| Regenerated | 85% | 85% | 91% |
| Example 1 (according to the invention) | 95% | 98% | 103% |

The activity results are expressed as percentage of fresh catalyst. These results show that the rejuvenated catalysts are more efficient than the regenerated ones and even more efficient than the fresh ones in term of hydrodesulfurization (HDS) activity, in particular for the rejuvenated Commercial CoMo catalyst 2 for which the activity is superior to 100%.

Example 2: Additional Results

Catalyst DN-3100 has been rejuvenated with the process according to the present invention. The hydrodesulfurization relative volume activity (HDS-RVA) has been measured for the rejuvenated catalyst prepared.

The composition of the regenerated hydrotreating catalyst is:

| Catalyst | Carbon content (wt %) | Molybdenum content (wt %) | Cobalt content (wt %) | Nickel content (wt %) | Phosphorus content (wt %) |
|---|---|---|---|---|---|
| Example 2 (DN-3100) | 0.05 | 12.47 | — | 3.10 | 3.13 |

The hydrotreating catalyst has been submitted to the impregnation step according to the following conditions:

| Example | Concentration of the impregnating solution (wt %) | Concentration (mol/mol of hydrogenation metals) | Drying temperature (° C.) | Aging time (hours) |
|---|---|---|---|---|
| 2 (catalyst DN-3100) | MoO$_3$ = 9.9 H$_3$PO$_4$ = 11.2 | 0.2 mol MoO$_3$/mol of hydrogenation metals 0.34 mol H$_3$PO$_4$/mol of hydrogenation metals | 120 | >16 |

The activity of regenerated and rejuvenated DN-3100 catalyst has been checked with Melgo feedstock using the following operational conditions: P=41.4 bar; LHSV=1.0 hr$^{-1}$; H$_2$/Oil=214 sl/l; WABT=354.5° C.

The composition of Melgo feedstock is:

| | | |
|---|---|---|
| SULFUR | MG/KG | 11000 |
| NITROGEN BASIC | MG/KG | 44.0 |
| NITROGEN | MG/KG | 120 |
| DENSITY AT 25° C. | G/ML | |
| DENSITY AT 15° C. | G/ML | 0.8534 |
| HYDROGEN | WT % | |
| MONO-AROMATICS | WT % | 17.1 |
| DI-AROMATICS (DAH) | WT % | 11.5 |
| TRI+-AROMATICS (T+AH) | WT % | 1.0 |
| POLYCYCLIC AROMATIC | WT % | 12.5 |
| TOTAL AROMATICS | WT % | 29.6 |
| BROMINE NUMBER | G/100 G | 1.0 |

The result obtained is:

| Example | HDS-RVA (regenerated catalyst) % | HDS-RVA (rejuvenated catalyst) % |
|---|---|---|
| 2 (catalyst DN-3100) | 79 | 112 |

The rejuvenated catalyst shows excellent percentage of HDS-RVA. This percentage is even superior to 100 which means that the activity of the rejuvenated catalyst is superior than the fresh catalyst.

These results prove that the rejuvenating process according to the present invention allows recovering catalyst's activity superior to the regenerated catalysts and even superior to the fresh catalysts. Thus, the rejuvenated catalyst has recovered a catalytic activity superior to the fresh catalyst.

The invention claimed is:

1. A process for rejuvenating a hydrotreating catalyst comprising a group VIB hydrogenation metal and/or a group VIII hydrogenation metal, which comprises:
    a) regenerating the catalyst by contacting said catalyst with an oxygen containing gas at a temperature from 300° C. to 550° C.,
    b) impregnating the regenerated catalyst with an impregnation solution which consists of a mixture of water and a combination of MoO$_3$ and H$_3$PO$_4$, excluding any other compounds,
    c) aging the impregnated catalyst for at least 2 hours at room temperature and
    d) drying the aged catalyst,
    wherein the impregnation of the catalyst with said impregnation solution leads to the rejuvenation of said catalyst.

2. The process according to claim 1, wherein the temperature of the drying is from 80° C. to 200° C.

3. The process according to claim 1, wherein the content of carbon at the end of the regeneration is less than 0.5 wt % based on the total weight of the catalyst.

4. The process according to claim 1, wherein the concentration of MoO$_3$ is from 0.10 mol of MoO$_3$/mol of hydrogenation metals to 1.0 mol of MoO$_3$/mol of hydrogenation metals based on the regenerated catalyst.

5. The process according to claim 1, wherein the concentration of H$_3$PO$_4$ is from 0.10 mol of H$_3$PO$_4$/mol of hydrogenation metals to 1.0 mol of H$_3$PO$_4$/mol of hydrogenation metals based on the regenerated catalyst.

6. The process according to claim 1, wherein the concentration of MoO$_3$ in the impregnation solution is from 5 wt % to 25 wt %.

7. The process according to claim 1, wherein the concentration of H$_3$PO$_4$ in the impregnation solution is from 5 wt % to 25 wt %.

8. The process according to claim 1, wherein the hydrotreating catalyst is a non-additive based catalyst wherein no organic additive has been included therein prior to its use in the hydrotreating process of a hydrocarbon feedstock or prior to a presulfurization treatment performed before the use in the hydrotreating process or an additive based catalyst wherein an organic additive has been included therein prior to its use in the hydrotreating process of a hydrocarbon feedstock or prior to a presulfurization treatment performed before its use in the hydrotreating process.

9. The process according to claim 1, wherein the hydrotreating catalyst, before being submitted to the process, comprises: from 10 to 20 wt % of group VIB hydrogenation metal and/or from 3 to 5 wt % group VIII hydrogenation metal, the concentration of group VIB hydrogenation metal and the concentration of group VIII hydrogenation metal being expressed as element.

10. The process according to claim 1, wherein the group VIB hydrogenation metal is molybdenum.

11. The process according to claim 1, wherein the group VIII hydrogenation metal is cobalt, nickel or a mixture thereof.

12. The process according to claim 1, wherein the hydrotreating catalyst comprises halogens, phosphorus, boron or any mixture thereof.

13. The process according to claim 1, wherein the hydrotreating catalyst comprises a porous carrier that comprises alumina.

14. The process according to claim 1, wherein the catalyst is contacted with a hot steam or gas, diluted air, natural gas combustion products or nitrogen at a temperature from 150 to 450° C. prior to the regenerating the catalyst.

15. The process according to claim 1, wherein it comprises a sulfidation after the drying the aged catalyst.

16. The process according to claim 1, wherein the aging time of the impregnated catalyst lasts for at least 2 hours.

17. The process according to claim 16, wherein the aging time of the impregnated catalyst lasts for at least 6 hours.

18. The process according to claim 17, wherein the aging time of the impregnated catalyst lasts for at least 14 hours.

19. The process according to claim 1, wherein the aging time of the impregnated catalyst does not exceed 504 hours.

20. The process according to claim 19, wherein the aging time of the impregnated catalyst does not exceed 336 hours.

* * * * *